E. K. SMITH.
ROCK DRILL EXTRACTOR.
APPLICATION FILED DEC. 21, 1910.
1,007,248.
Patented Oct. 31, 1911.
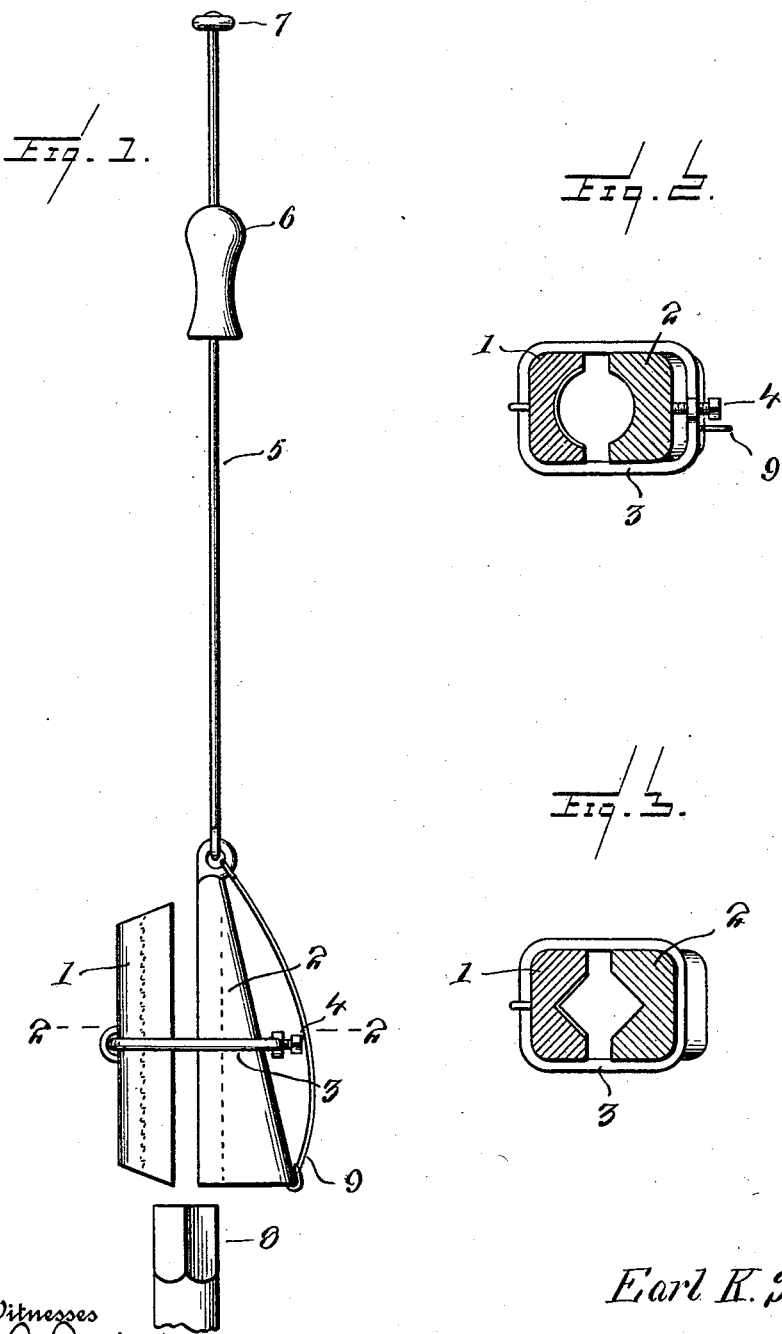
Inventor
Earl K. Smith
By Victor J. Evans
Attorney

UNITED STATES PATENT OFFICE.

EARL K. SMITH, OF TONOPAH, NEVADA.

ROCK-DRILL EXTRACTOR.

1,007,248. Specification of Letters Patent. Patented Oct. 31, 1911.

Application filed December 21, 1910. Serial No. 598,507.

*To all whom it may concern:*

Be it known that I, EARL K. SMITH, a citizen of the United States, residing at Tonopah, in the county of Nye and State of Nevada, have invented new and useful Improvements in Rock-Drill Extractors, of which the following is a specification.

The present invention is designed primarily to supply a device whereby a rock drill when bound may be easily removed from the opening.

The invention contemplates a clamp for gripping the tool and means coöperating with the clamp for jarring the tool so as to loosen the same and facilitate its removal from the opening.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of an appliance embodying the invention. Fig. 2 is a horizontal section thereof on the line 2—2 of Fig. 1. Fig. 3 is a horizontal section of a modification.

Corresponding and like parts are referred to in the following description, and indicated in all the views of the drawing, by the same reference characters.

The device consists essentially of a clamp and a jarring appliance for starting the tool or article to be loosened. The clamp is formed of two jaws 1 and 2 and a confining ring or band 3, the latter being loosely connected to one of the jaws and serving to confine the other jaw and cause an advancement or pressing together of the jaws so as to grip the tool or article placed between them upon applying force to one of the jaws in substantially the length of the clamp. The gripping faces of the jaws may be of any formation to insure their taking a firm hold upon the tool or other article to be gripped thereby. In the preferred construction the gripping faces of the jaws are serrated or roughened. The gripping faces of the jaws may be of any formation, but it is preferred to depress the gripping faces intermediate of their longitudinal edges so as to centralize the tool or other article held between the jaws and thereby prevent lateral displacement thereof. By making the jaws hollow they are further enabled to more firmly grip the article held between them. One of the jaws, as 1, is straight whereas the other jaw 2 is made tapering so as to operate by a wedge action. The ring or band 3 is loosely connected to the jaw 1 and the jaw 2 is adapted to move freely through the ring or band 3. A set screw 4 may be threaded into the part of the ring or band 3 opposite the outer inclined side of the jaw 2, thereby admitting of adjusting the jaw to the size of the tool or other article to be gripped. While it is preferred to employ a set screw 4 the latter may be dispensed with, as indicated in Fig. 3.

The jarring device consists of a rod or bar 5 which is connected to the movable jaw 2 and a hammer 6 slidably mounted upon the rod 5. A knob 7 is formed upon the upper end of the rod 5 and is adapted to be engaged by the hammer 6 so as to jar the clamp sufficiently to loosen or start the tool gripped between the jaws 1 and 2. The rod or bar 5 may be of any length and its lower end is looped into an eye formed in the upper smaller end of the jaw 2, thereby admitting of turning the rod 5 to any position as well as to fold the same upon the clamp to reduce the length of the device when not required for immediate service.

In practice suppose it be required to remove a drill from an opening in a rock, the projecting end of the drill 8 is introduced between the jaws 1 and 2, after which the jaw 1 is held and the jaw 2 moved longitudinally when at the same time it will be pressed inward toward the jaw 1 by its outer inclined side riding upon the inner edge of the ring or band 3, thereby causing the two jaws to grip the drill 8 or like part between the jaws. After the clamp has been placed in position upon the drill or like part it is held in place by one hand and the other hand grasps the hammer 6 and moves the same upwardly on the rod 5 into contact with the knob 7, thereby imparting an upward blow to the clamp, which serves to tighten the same upon the drill and also to jar the drill which tends to loosen the same. The operation is repeated until the drill is loosened sufficiently to enable its easy removal from the opening. To prevent misplacement of the jaw 2 a flexible connection 9 may be employed, said connection being attached at one end to the ring or band 3 and at its opposite end to the jaw 2, as indicated most clearly in Fig. 1.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. An extractor for removing drills and like tools, the same comprising a clamp to be fitted to the part to be removed, a rod connected to the clamp and having a stop, a hammer slidably mounted upon the rod, and means utilizing the blow of the hammer to tighten the grip of the clamp and to loosen the part to be removed.

2. An extractor for removing drills, tools and the like, the same comprising a clamp, a rod connected to one member of the clamp and having a stop, a hammer slidably mounted upon the rod, and means connecting the members of the clamp to tighten their grip by the blow of the hammer to loosen the part to be removed.

3. An extractor of the character described comprising two jaws, connecting means between the two jaws to effect a closing thereof upon imparting longitudinal movement to one of the jaws, a rod connected to the movable jaw and having a stop, and a hammer mounted upon the rod to impart a blow thereto.

4. An extractor for the purpose set forth comprising two jaws, a band having connection with one of the jaws and receiving the other jaw which latter is movable and of wedge form, and jarring means connected to the movable jaw for imparting blows thereto.

5. An extractor of the character set forth comprising a straight jaw, a band loosely connected thereto, a second jaw tapering in length and passing loosely through the said band, a rod connected with the movable jaw and having a stop, and a hammer slidably mounted upon the rod.

6. An extractor comprising a jaw, a band loosely connected with the jaw, a tapered jaw slidably mounted within said band, a jarring device applied to the movable jaw, and a set screw fitted to the said band and adapted to have its inner end engage the outer inclined side of the tapered jaw.

In testimony whereof I affix my signature in presence of two witnesses.

EARL K. SMITH.

Witnesses:
J. D. DOBBINS,
SAMUEL FROEDE.

---

Copies of this patent may be obtained for five cents each, by addressing the "Commissioner of Patents, Washington, D. C."